UNITED STATES PATENT OFFICE.

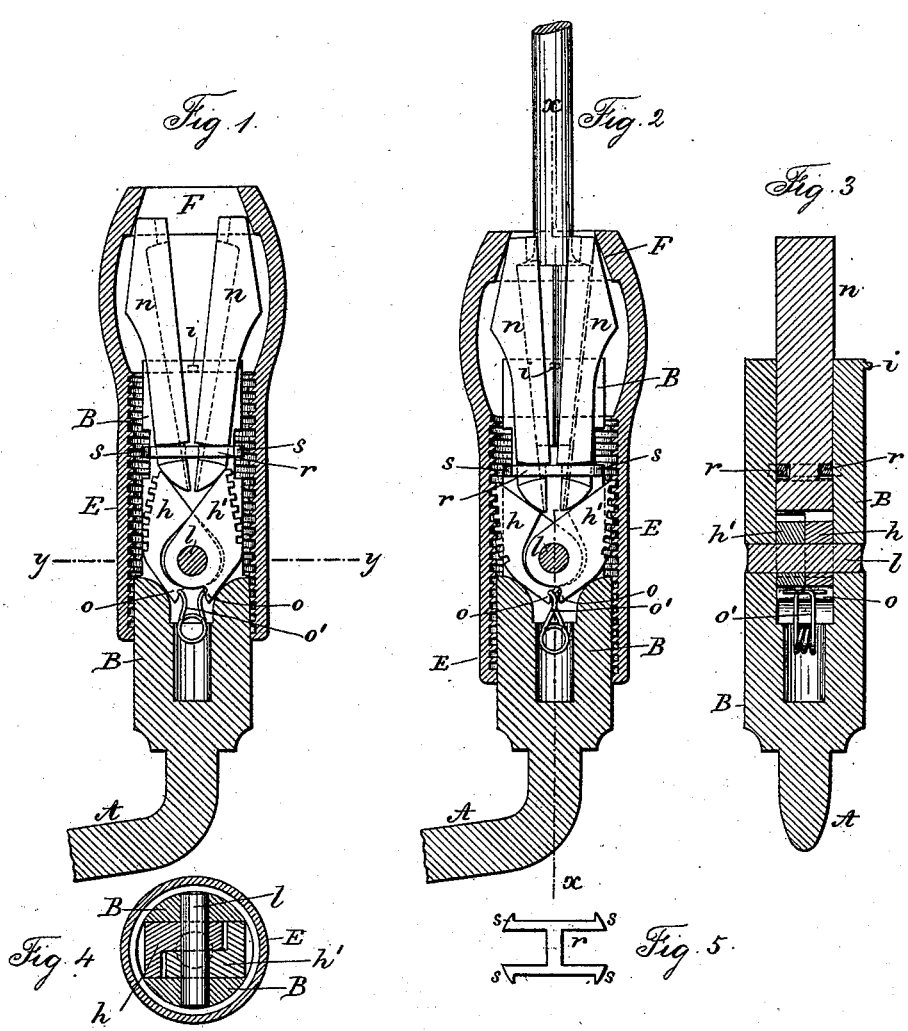

JOHANNES TH. PEDERSEN, OF BROOKLYN, NEW YORK.

BIT-BRACE.

SPECIFICATION forming part of Letters Patent No. 313,950, dated March 17, 1885.

Application filed October 11, 1884. (No model.)

*To all whom it may concern:*

Be it known that I, JOHANNES THEODOR PEDERSEN, of Brooklyn, (Greenpoint,) in the county of Kings and State of New York, have invented an Improvement in Bit-Braces, of which the following is a specification.

The tool-holder at the end of a brace is usually made with a sleeve having an internal screw-thread and grasping-jaws for the tool. These jaws are adapted to close around the square base of the tool, and in order to remove the tool it is often necessary to revolve the screw-sleeve several times to give the necessary space between the jaws and the tapering interior of the sleeve for allowing the jaws to open, and in closing the jaws around the end of the tool the same extent of revolving movement is needed for clamping such tool.

My improvement is made for the purpose of disconnecting a sectional screw from the interior of the screw-sleeve, so that said screw-sleeve can be slipped endwise to either release or grasp the tool by the jaws. The screw-section is made in two parts, and when the tool is pressed into the jaws the sectional screw is opened to engage the screw-threads inside the sleeve, and the parts are firmly clamped by a revolution or partial revolution of the sleeve. To release the tool a partial revolution loosens the parts, so that as the tool is drawn upon the sectional screw disengages from the sleeve, and the sleeve is free and moves along with the jaws and relieves the pressure upon such jaws, and they open and liberate the tool. By this improvement the tool can be clasped or released more rapidly than in the bit-braces heretofore made use of.

In the drawings, Figure 1 is a longitudinal section of the brace-bit with the parts loose and ready to receive a bit. Fig. 2 is a similar view with the parts as grasping a bit. Fig. 3 is a section longitudinally of the stock at the line *x x*. Fig. 4 is a cross-section at the line *y y*, and Fig. 5 is a plan of the H-shaped stop for the jaws.

The end of the crank or bow of the brace is shown at A, and the slotted cylinder B is attached to or formed with the brace A. The exterior of the cylinder B is plain, and around the same the sleeve or tubular nut E is placed. The outer end of this sleeve is contracted to form the interior conical jaw-closer, F, as usual. Near the end of the split cylinder B there is a projection or pin, *i*, that is adapted to pass through the groove of the screw-thread when the sleeve E is screwed over the split cylinder B, and, when the pin *i* passes beyond the threads within the sleeve E, such sleeve can be slipped freely but a limited extent up or down upon the split cylinder, the pin *i* preventing the sleeve falling off. The cylinder B is slotted longitudinally, the inner faces of the jaws at the sides of the slot being parallel or nearly so. Within this slot are the two-part screw-sections, *h h'*, that are provided with downward projections that are half the thickness of the screw-sections, so as to lie side by side, and with the pivot-pin *l*, that passes through the same, form joints upon which the screw-sections can swing laterally within the slot of the cylinder B. The screw-threads are cut upon the outer edges of the sections, and when these sections are spread apart the threads engage the internal thread of the sleeve E. There are toe-pieces *o o*, one on each screw section, and between them is the expansive spring *o'*, which acts to swing the screw-threaded portions inwardly and disconnect them from the screw-sleeve. There are jaws *n n* within the slotted cylinder. The faces of these jaws are adapted to receive the square base of the tool, and the outer edges of the jaws are inclined so as to be acted upon by the interior conical surface of the sleeve, as usual. The inner ends of these jaws are made as inclines, so that when the base of the tool is placed between the jaws *n* and pushed inwardly the inclined ends of the jaws pass in between the inclined portions of the screw-sections *h h'* and spread them apart, and cause the threads to engage the threads of the screw-sleeve, so that by a turn or partial turn of the sleeve the tool will be clamped.

It is to be borne in mind that when the tool is introduced the brace is usually held so that the tool-stock is vertical, and hence that the screw-sleeve will slide down over the cylinder, and has to be lifted to allow the jaws to be opened for the reception of the tool, and said sleeve slides down again as soon as liberated after the tool has been entered between the jaws; hence such sleeve is suspended by its conical interior surface resting upon the jaws h h', and when the screw-sections are forced out by pressing in the tool and its jaws the sleeve requires but a small amount of rotary movement to firmly bind the tool by the jaws, and in so doing to spread the screw-sections and force them firmly into the screw-threads of the sleeve. It is necessary to hold the two jaws h h' in their proper relative positions, and to allow them to be moved endwise in the slotted cylinder. Any known or suitable device may be used for this purpose. I, however, have employed and shown the H-shaped piece r. (See Figs. 1, 2, 3, and 5.) This piece is entered into the slotted cylinder with its end lips, s, in recesses formed by removing the edges of the metal at the sides of the slot, as seen in Figs. 1 and 2. These lips limit the movement of this stop r endwise of the slot and cylinder. The sides of the jaws, near their inner ends, are slotted with wedge-shaped slots, so that the said ends can be entered laterally between the respective legs of the H-shaped stop r, and said jaws can swing at their outer ends the amount required in opening and closing for the base of the bit.

I claim as my invention—

1. The combination, with the slotted cylinder and the sleeve having an internal screw-thread, of screw-sections within the slotted cylinder, a pivot upon which such sections can swing out of contact with the sleeve, a pair of tool-holding jaws within the slot, the inner ends of which act against the inclined ends of the screw-sections to force the same into contact with the screw, substantially as set forth.

2. The combination, with the slotted cylinder and two holding-jaws, of the H-shaped stop r, passing into grooves in the sides of the jaws, and having end lips, s, outside the edges of the slotted cylinder, substantially as set forth.

3. The combination, with the slotted cylinder and the screw-sleeve, of the sectional screw, the pivot for the same, the spring to force the screw-sections out of contact with the screw in the sleeve, the two part jaws, and the H-shaped stop, substantially as set forth.

Signed by me this 3d day of October, A. D. 1884.

JOHANNES TH. PEDERSEN.

Witnesses:
 GEO. T. PINCKNEY,
 WILLIAM G. MOTT.